July 2, 1957

P. URBAN 2,797,903

CONTACTING VESSEL

Filed July 19, 1955

INVENTOR:
Peter Urban

By: Chester J. Giuliani
ATTORNEY:

Glen R. Grunewald
AGENT:

United States Patent Office 2,797,903
Patented July 2, 1957

2,797,903
CONTACTING VESSEL

Peter Urban, Chicago, Ill., assignor to Universal Oil Products Company, Des Plaines, Ill., a corporation of Delaware Application July 19, 1955, Serial No. 522,927

1 Claim. (Cl. 259—107)

This invention relates to a contacting vessel and particularly to a contacting vessel wherein viscous or caking material is to be contacted with a liquid, mixed or stirred.

In many processes a liquid is to be mixed with a solid or contacted with a solid and in the process there results a viscous material or a caking of the solid on the sides of the container. Typical of these processes are mixing of dough, paste, gels or contacting a liquid with solid particles which tend to accumulate on the container wall and thereby to be out of contact with the mixture as for example in mixing pigments, digesting or leaching soluble components from a solid, evaporating a mixture. In this type of process the mixture is frequently contained in a vat which has a stirrer therein.

When contacting or mixing the difficult material hereinbefore described, the stirrer must have close tolerance with the walls of the container if the material is to be homogeneously treated. It is an object of this invention to provide a vessel which eliminates the necessity for close tolerance between the stirrer and the vessel wall but nevertheless allows the material on the vessel wall to be moved into the main part of the vessel.

This object is accomplished by maintaining a flexible lining within the contacting vessel with expandable and inflatable means between the flexible lining and the rigid vessel wall so that the flexible lining can be distorted thereby breaking the caked material thereon and returning it into the central portion of the vessel.

In one embodiment the present invention provides a contacting vessel comprising in combination a shell and a flexible lining with inflatable expanding means disposed therebetween.

In another embodiment this invention provides a mixing apparatus comprising in combination a shell and a flexible lining with inflatable expanding means disposed therebetween and having agitating means maintained therein.

In a more specific embodiment the present invention provides a mixing apparatus comprising a shell and a flexible lining with inflatable means disposed therebetween and having an agitating means of substantially lesser diameter than said liner when it is not deformed, maintained therein.

The apparatus of this invention can perhaps be best explained with reference to the accompanying drawing.

Figure 3:
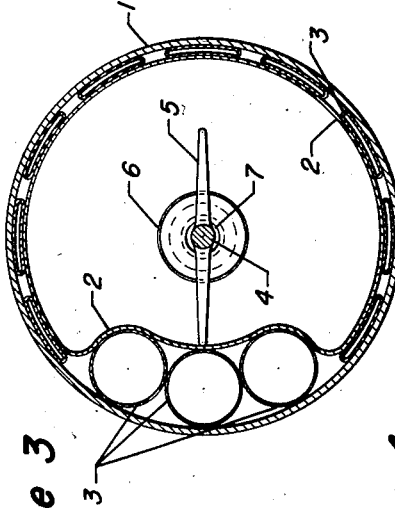
Figure 4:
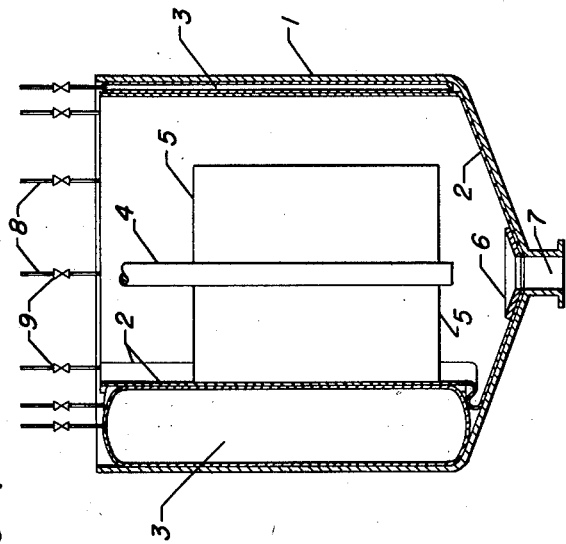
Figure 1:
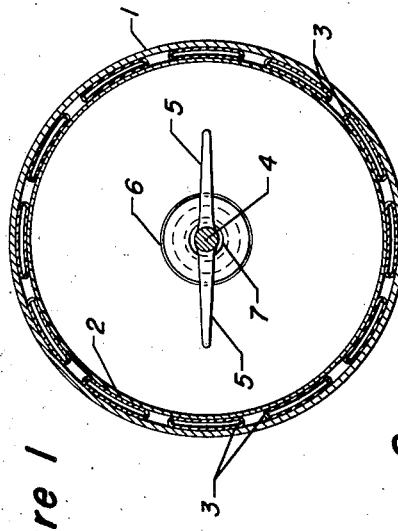
Figure 2:
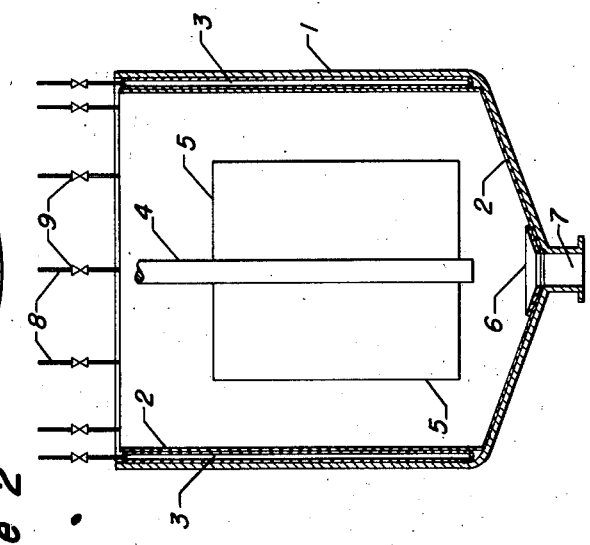

In the drawing Figures 1 and 2 illustrate respectively a plan and sectional elevational view of one embodiment of this invention illustrating its use in the undeformed state while Figures 3 and 4 show the same views illustrating the inflatable means in an inflated state.

Referring to Figure 1, outer shell 1 which is usually composed of steel or other rigid material and is preferably cylindrical in shape contains therein deformable liner 2 which may be of any suitable material such as rubber, plastic, fabric, treated fabric, etc., and is made to conform to the general contours of shell 1. Between shell 1 and flexible, deformable liner 2 there is disposed expandable, inflatable means 3, shown in Figure 1 in a deflated condition. These means, like the liner itself, may be made of any flexible and fluid tight material such as rubber, plastic, fabric, etc. In this particular embodiment flexible liner 2 is sealed against the bottom of vessel 1 by means of flange 6 which comprises the liner against the rigid shell by means of bolts, etc. not shown. Flange 6 may, of course, be substituted with any equivalent means which may seal the liner 2 to shell 1 or to the interior of outlet conduit 7 maintained in the lower portion thereof.

In this particular embodiment the equipment is shown with a stirrer comprised of shaft 4 and paddles 5. It will be noted that the stirrer is of substantially smaller diameter than the interior of the vessel and therefore it need be finely machined or rigidly supported in order to properly function.

Figure 2, as hereinbefore stated, shows a sectional, elevational view of the equipment of Figure 1 and better demonstrates the relative position of shell 1, liner 2 and inflatable means 3. It may be noted here that inflatable means 3 contains line 8 and valve 9 at the top thereof for regulating the flow of inflating fluid to and from means 3. In this particular embodiment the inflatable means are vertically disposed individual tubes which each have their own inflating fluid inlet and outlet conduit and valve, however, it is within the scope of this invention to employ circular, horizontally disposed tubes, such as inner tubes from tires, or diagonally disposed tubes when the particular mode of operation makes such shapes appropriate. It is also within the broad scope of this invention to employ routing means such as a stepping relay or other equivalent device which causes consecutive or alternate deflatable means to inflate and deflate at regular periods and in an established cycle when used with electrically operated valves so that each portion of the flexible liner 2 is inserted into the central portion of the device at a regular interval. It is also within the broad scope of this invention to regulate the period of inflating by the viscosity or thickness of the cake on the wall thereof and it is further within the broad scope of this embodiment to employ the apparatus without a paddle wherein a propeller or fluid stream is employed as the mixing means.

Figure 3 illustrates this particular embodiment of this invention with some of the inflatable means 3 in the inflated condition. It will be noted that rigid vessel wall 1 maintains its shape when the inflated means 3 are inflated and flexible liner 2 at the point of the filled inflatable means is pushed into the central portion of the vessel and into contact with blades 5 of the paddle. It may readily be seen that the material adhering to wall 2 will be scraped off and recombined with the main portion of the mass continued therein.

Figure 4 illustrates an elevation view of Figure 3 to better illustrate the contact obtained therein.

From the foregoing it may be seen that the apparatus of this invention provides means for mixing viscous, doughy, or caking material to give homogeneous treatment to the entire mass without expensive or closely machined equipment.

I claim as my invention:

A mixing apparatus comprising a chamber having rigid walls, agitating means within the chamber, a flexible inner lining for the chamber normally out of contact with the agitating means and conforming to the general contour of the chamber, and inflatable expanding means between said rigid walls and said flexible lining for pushing the latter toward the agitating means.

References Cited in the file of this patent

UNITED STATES PATENTS

| | | |
|---|---|---|
| 1,107,339 | Milliron | Aug. 18, 1914 |
| 1,622,294 | Saulnier | Mar. 29, 1927 |